Nov. 7, 1933.   R. P. RUSSELL   1,934,093
METHOD OF OBTAINING LOW BOILING OILS FROM HIGHER BOILING OILS
Filed March 6, 1930

INVENTOR.
Robert P. Russell
BY
W. E. Currie
ATTORNEY

Patented Nov. 7, 1933

1,934,093

UNITED STATES PATENT OFFICE 1,934,093

METHOD OF OBTAINING LOW BOILING OILS FROM HIGHER BOILING OILS

Robert P. Russell, Baton Rouge, La., assignor to Standard-I. G. Company

Application March 6, 1930. Serial No. 433,587

5 Claims. (Cl. 196—53)

The present invention comprises an improved method for obtaining valuable low boiling hydrocarbons from higher boiling hydrocarbons by the action of hydrogen at an elevated temperature and also to an improved apparatus for carrying out the above process. The invention will be fully understood from the following description and the drawing which illustrates the construction of the apparatus.

Figure 1:
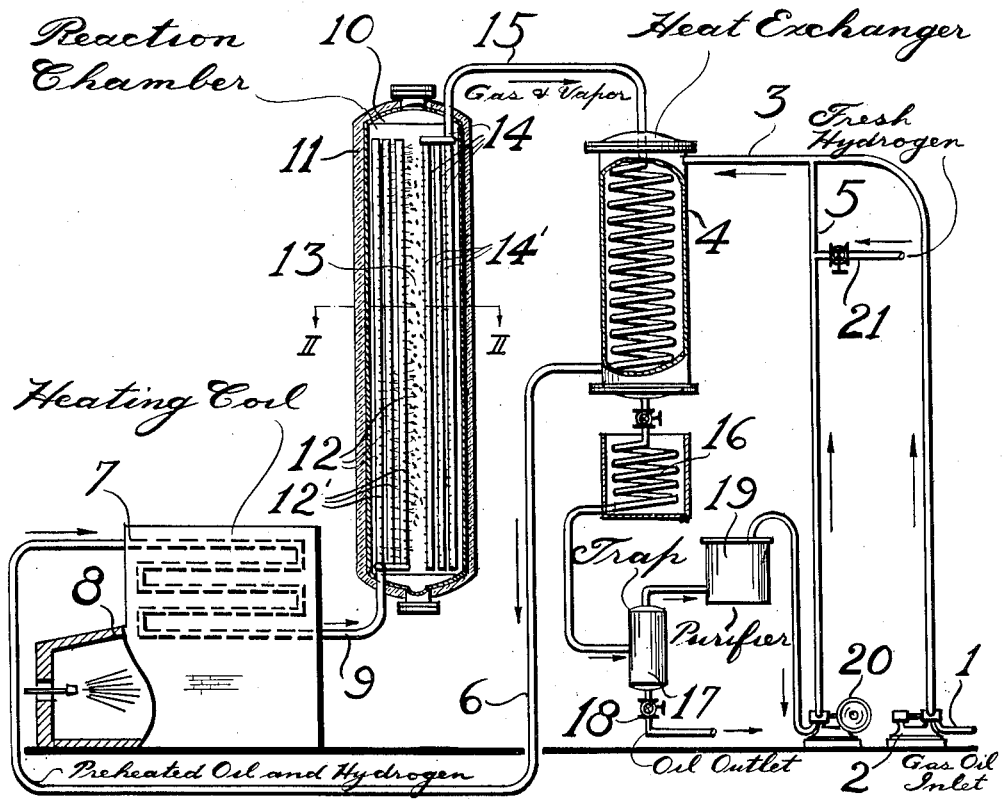
Fig. 1 is a diagrammatic sketch in elevation of an apparatus constructed to carry out the improved process and indicates the construction of the reaction chamber.
Figure 2:
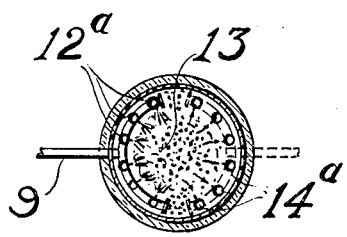
Fig. 2 shows a horizontal section taken along the line II—II of Fig. 1.

Referring to the drawing, Figs. 1 and 2, oil such as gas oil, kerosene or the like is withdrawn from any suitable storage through line 1 and is passed by a pump 2 through pipe 3 to heat exchanger 4. Hydrogen under high pressure is supplied through a pipe 5 mixing with the oil in pipe 3 prior to passage through the heat exchanger. The mixture of preheated oil and hydrogen then flows by line 6 to heating coil 7 arranged in suitable furnace setting 8. The heated mixture is then discharged by line 9 into a reaction chamber 10 which is suitably protected from loss of heat by an insulating cover 11. The heated mixture is discharged into the interior of the drum by means of one or preferably a series of pipes 12 connected at their lower ends to the pipe 9 and running substantially the entire length of the reactor drum 10. The pipes 12 are preferably arranged in the arc of a circle around the interior of one side of the reactor, as shown in Fig. 2. These pipes are perforated with small holes 12' along their entire length so as to allow for an even distribution of the oil and gas at all levels in the drum. The reactor drum 10 is preferably packed with a suitable catalytic material indicated at 13 the nature of which will be fully disclosed below. A single pipe 14 or a series of pipes connected at their upper ends are disposed in the reactor running substantially the length of the same and placed in the arc of a circle opposite corresponding inlet pipes 12. Gas and vapor is withdrawn through holes 14' in the pipes 14 and removed from the reactor by a pipe 15 which is in communication with the exchanger 4 and with the condensing coil 16. The cooled mixture of oil and gas is discharged into trap 17 from which the oil is withdrawn by pipe 18 to storage and the gas is taken preferably under full pressure from the upper part of the trap to a purification system indicated at 19. This system may comprise an oil scrubbing tower operated at high pressure, capable of removing hydrogen sulfide and substantially all hydrocarbon constituents. The purified gas is recompressed by a booster pump 20 and again forced into line 5. Fresh hydrogen is admitted by pipe line 21.

Figure 3:
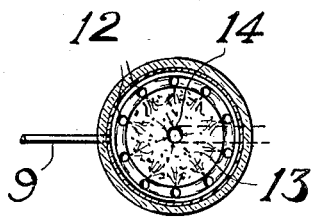
Fig. 3 shows a sectional view of the drum according to a modified design.

Fig. 3 is a cross-sectional view of a modified form of the reactor in which pipes 12 are arranged around the inner wall of the drum and pipe 14 is placed in the center. It will be understood that the central pipe might be used as the inlet and the surrounding pipes as outlets, if desired. As before pipes 12 and 14 are connected with the exterior of the drum by pipes 9 and 15 respectively.

In the operation of this process oils capable of complete vaporization, such as gas oils, kerosene, naphthas and the like are forced through a heating coil with hydrogen into a reaction chamber packed with a suitable catalyst. The oil may be more or less completely vaporized in the coil 7 or such vaporization may be brought about by contact with the catalytic mass which causes a substantial evolution of heat. The reaction drum is preferably held at a temperature in excess of about 900° F. and may be in excess of 950 or 1000° F. The pressure should be in excess of about 20 atmospheres, but it is preferred to operate at 200 atmospheres or more. As catalytic agents, oxides of chromium, molybdenum and tungsten, either in admixtures with each other or with other oxides, such as magnesia, lime, alumina and zinc oxide, are preferred. These catalytic materials are sulphactive, that is retain their hydrogenating activity even in the presence of sulfur or sulfur containing compounds.

Since there is a marked evolution of heat within the drum due to the reaction which takes place it is sometimes extremely difficult to control the temperature and we have found that the temperature may vary from time to time by more than 50 or even 100° F. in the various parts of the drum. This condition is highly undesirable since it produces un-uniform products and the extremes of temperature often have a deleterious effect on the activity of the catalytic mass. It has been found that satisfactory results can be obtained by causing the oil and vapor to relatively short path through a large cross-sectional area at right angles to the direction of flow. This can be accomplished by using an elongated reactor packed with catalyst and provided with one or more inlet and outlet pipes arranged longitudinally therein on opposite sides and running substantially its entire length. These pipes are closed at one end may be perforated with small holes uniformly spaced along their length through which the vapors flow into and out of the bed of catalyst. Substantially the same results can be obtained with a central pipe 14 and surrounding pipes 12 as shown in Fig. 3.

In commercial sized equipment the path of flow should be less than about 5' preferably less than 3' but at the same time the rate of flow should not be below 1 volume of liquid oil per hour per volume of the drum and sufficient to produce at least 20% of light oil boiling below 400° F.

As an example of the operation of this process, two experiments are carried out under substantially the same conditions as follows:—A gas oil having a gravity of 38.7° A. P. I. and boiling below about 620° F. with a sulphur content of .146% is fed at a rate of two volumes of oil per volume of reactor space per hour. The volume of hydrogen used is about 2300 cubic feet per barrel of oil. The temperature is about 950° F. and the catalyst comprises a mixture of tungsten and magnesium oxides. In the first case the flow through the oven is by a single passage upward and it is found that from time to time variations of as much as 60° F. are found from point to point in the reactor. In the second experiment the oven was constructed with a single inlet and one outlet pipe both running the length of the reactor, according to the description of the present invention. In this case it was found that the maximum variations of temperature from point to point was about 60° F. over a period of 130 hours. In each case about 75% of the fresh feed is converted into a product boiling below about 400° F. which is admirably adapted for use as motor fuel, and the fractions boiling above 400 were continuously recycled through the reactor with the fresh feed. There was little or no deposit of carbonaceous material on the catalyst, and it is clearly shown that operation with the short pass type of reactor is decidedly more uniform and gives substantially better results than with the single pass reactor, in which a relatively long path of contact is provided.

The invention is not to be limited by any theory of the mechanism of the reactor nor to any examples which may have been given for purely illustrative purposes, but only by the following claims in which I wish to claim all novelty inherent in the invention.

I claim:

1. In a process for the destructive hydrogenation of oil at temperatures above about 900° F. and at pressures in excess of 20 atmospheres, the improvement which comprises passing a mixture of oil and a gas rich in free hydrogen through a bed of solid catalyst arranged for a relatively short path of flow therethough, and with a relatively extended sectional area at right angles to the direction of flow, introducing the oil and gas mixture into the catalytic material by means of a large number of inlets substantially uniformly spaced, and collecting the mixture of reactants after passage through the catalyst bed by a large number of exits also uniformly spaced.

2. Improved process according to claim 1 in which the path of flow is less than 5 feet.

3. An improved process according to claim 1 in which the velocity is not less than 1 volume of oil measured as a liquid, per hour per volume of catalyst.

4. A conversion chamber for destructive hydrogenation comprising an elongated reaction vessel, a group of substantially parallel pipes disposed longitudinally in the reaction vessel and adjacent the periphery of one side thereof, the side walls of said pipes having substantially uniformly spaced perforations to provide means for introducing oil and hydrogen into the reaction vessel, and a second group of substantially parallel pipes disposed longitudinally adjacent the periphery of the opposite side of the reaction vessel, the side walls of the said second group of pipes having substantially uniformly spaced perforations to provide means whereby vapors may be withdrawn from the reaction vessel after a relatively short path of flow through the reaction vessel between the first and second groups of pipes.

5. A conversion chamber for destructive hydrogenation comprising an elongated reaction vessel, a plurality of substantially parallel pipes disposed longitudinally in the reaction vessel adjacent to the periphery thereof, the side walls of said pipes having substantially uniformly spaced perforations to provide means for introducing oil and hydrogen into the reaction vessel, and a pipe disposed longitudinally in the approximate center of the reaction vessel, the side walls of this centrally disposed pipe having substantially uniformly spaced perforations to provide means whereby vapors may be withdrawn from the reaction vessel after a relatively short path of flow through the reaction vessel between the peripherally disposed pipes and the centrally disposed pipe.

ROBERT P. RUSSELL.